United States Patent [19]

Cooper

[11] Patent Number: 4,892,432
[45] Date of Patent: Jan. 9, 1990

[54] CLIP FOR SECURING ROTATING PARTS
[75] Inventor: David G. Cooper, Urmston, England
[73] Assignee: Eaton Corporation, Cleveland, Ohio
[21] Appl. No.: 142,600
[22] Filed: Jan. 11, 1988
[30] Foreign Application Priority Data Jan. 24, 1987 [GB] United Kingdom ............... 8724966
Jan. 31, 1987 [GB] United Kingdom ............... 8702198

[51] Int. Cl.4 .................................................. F16B 2/20
[52] U.S. Cl. ................................... 403/297; 192/53 F;
74/439; 411/518; 403/326
[58] Field of Search ................... 403/326, 297, 344;
411/518, 521, 522, 516, 517, 519; 285/252, 253;
24/16 PB, 30.5 P; 192/53 F; 74/439

[56] References Cited
U.S. PATENT DOCUMENTS 3,662,645 5/1972 Bernard .............................. 411/518
3,799,002 3/1974 Richards .............................. 74/745
4,736,643 4/1988 Richards ............................ 192/53 F Primary Examiner—Randolph A. Reese
Assistant Examiner—Carol I. Bordas
Attorney, Agent, or Firm—H. D. Gordon

[57] ABSTRACT

A clip to clip independently rotatable parts that must be axially held relative to each other, but not be constrained from sliding axially together. Each part (9, 10) has a bore and an internal annular groove (28) and the clip has transverse flanges (23, 24) that spring out and enter the grooves when the bores are aligned. The clip has a gap so that the cross-section can be changed considerably by gripping holes in the flanges with long-nosed pliars, or other gripping tool, that can enter the internal bores, address the clip to the grooves, and release the clip to enter the grooves. The tool is also used to remove the clip for dissembling the parts. Thus the parts, e.g. mainshaft gears, that have to be slide each way to engage respective dogs, can be replaced individually - in contrast to existing gear-pairs which tend to be unseparable without destruction of the clip (and usually of both gears).

2 Claims, 5 Drawing Sheets

CLIP FOR SECURING ROTATING PARTS

BACKGROUND OF THE INVENTION

1. Field of the Invention

The present invention relates to a clip adapted for securing at least two rotating parts axially together while allowing their relative rotations with substantial freedom. The invention is advantageously applied to holding pairs of gears axially together in change speed gearboxes or transmissions, especially some of those in heavy duty goods vehicles (HGV's). The invention also relates to the parts when adapted for receiving such a clip, and the assembly.

In some gearboxes, pairs of gears rotate independently of each other on a shaft but they must move axially together as a pair for certain shifts. The invention is applicable where the gear-pairs slide against dog-clutches or the like fixed on the shaft (e.g. the mainshaft) in order to engage ratios, but not in those boxes where the clutches move axially and the gears stay axially stationary on the main shaft.

2. Description of the Prior Art

In the prior art, such sliding gear-pairs have been held axially together by each gear having extensions which telescope together, with respective grooves in the internal wall of the larger extension and the external wall of the smaller extension axially alignable to receive a circular spring clip. The clip axially holds the telescoped parts.

This way of holding is operative and indeed forms the state of the art, but has drawbacks. It requires telescoping parts. The clip is hard to install in a new telescoped (e.g. a telescoped gear pair). The gear pair is often impossible to separate, for instance if one not both is worn or damaged and needs to be scrapped, and can only be separated by breaking the clip, at best with possible damage to the parts or gears. It would be desirable if the clip were removable, (e.g. some time after installation).

SUMMARY OF THE INVENTION

According to the present invention:

(A) There is provided a circumferentially resilient spring clip comprising a group of (typically two) parallel axially spaced part-annular flanges extending outwardly from an axially rigid web extending parallel to but not on the axis, which web joins the flanges together while allowing their cross-sectional resilient contraction due to a circumferential gap in the spring clip. The flanges each have a shaping or formation, at the two ends each side of the gap, to allow cooperation of a tool, by which the clip can be not only resiliently compressed in cross-section, effectively in diameter, but also introduced along the insides of tubular bodies. The web may be almost a complete tube or cylinder having said gap to allow said compression and contraction.

(B) There is alternatively provided, for holding by the inventive clip, a gear group operative to be slidable axially as one, but to be rotatable independently of each other; wherein the gears each have a holding groove, both grooves being in internal walls thereof. The gears may be threaded over but need not be located radially by a mainshaft, (e.g. twin countershafts may radially locate them in well-known manner).

(C) Another aspect provides a gear pair required in operation to slide together as a pair about and along a shaft and carrying an external shaping to cooperate with the usual gear selector fork, the individual gears being also required to rotate independently of each other, in combination with a radially resiliently contractable holding clip with radially extensive flange portions for fitting in annular grooves in both gears to enable said requirements, wherein said annular groove in one gear is in an internal cylindrical wall, and said clip has a shaping to cooperate with a circumferentially compressing tool for installing the clip; characterized in that:

the groove in the other said gear is also in an internal cylindrical wall thereof;

the radially extensive portions of the clip are both outward radial extensions from a common web extending generally parallel to, but usually not on, a cylindrical axis; and the resilient circumferential and cross-sectional contraction, before an expansion towards normal cross-section is required on figment of the clip. The invention enables removal of the clip by the tool which was almost impossible in the prior art. There conceivably may be more than two gears and respective flange portions.

Further objects, features and advantages will appear from the following description of preferred embodiments given by way of example in conjunction with the drawings.

DESCRIPTION OF THE PREFERRED EMBODIMENT

Figure 1:
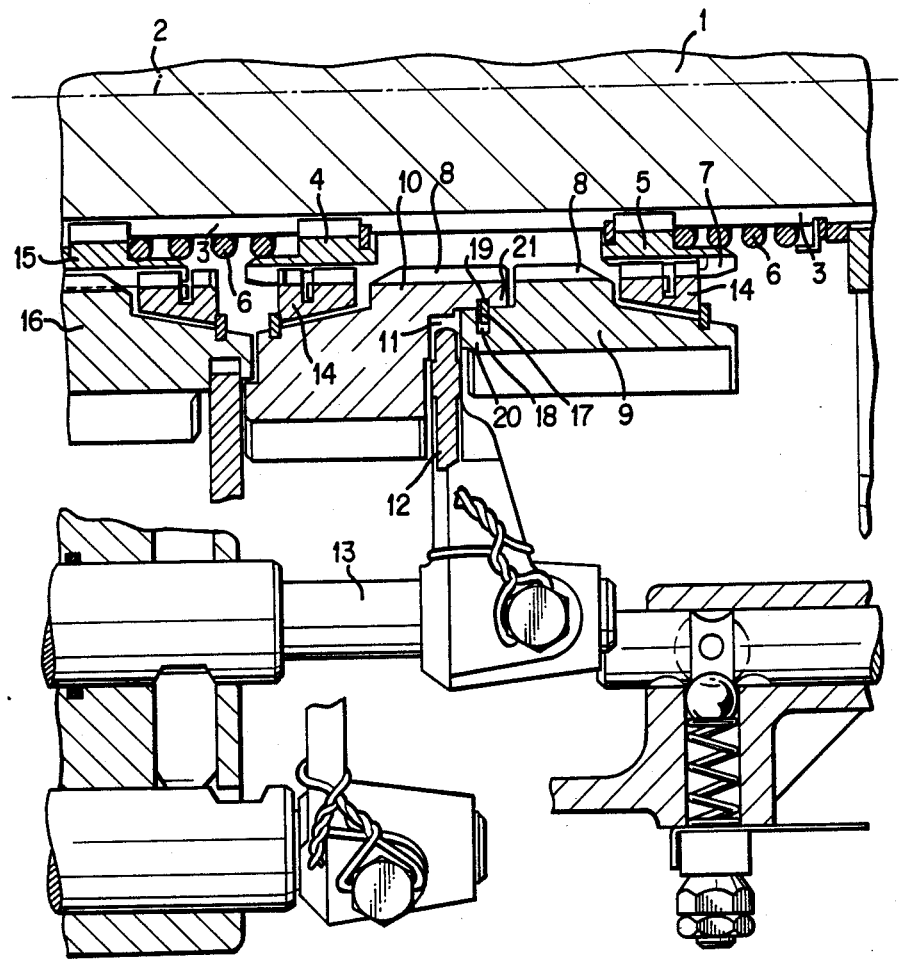
FIG. 1 is a radial section of a known gearbox, showing a clipped and axially secured gear pair according to the Prior Art.

Referring to FIG. 1, a mainshaft 1 on the rotational axis 2 of the gearbox has splines 3 on which dog clutch members 4 and 5 are rotationally fixed. In effect the dog clutch members are axially fixed on the mainshaft too, but the splines 3 and springs 6 allow a small measure of axial resilience. Dog clutch members 4 and 5 have external splines or teeth 7 to engage internal splines 8 on respective mainshaft gears 9 and 10 of a sliding pair in well known manner. The sliding pair have an external shaping, recess 11 to cooperate with the prong 12 of sliding means, conventionally a gear selector fork arranged by axially moving plunger 13 to slide axially, selectively to the right or left from the neutral position shown in FIG. 1.

Thus the gear pair 9/10 can be driven slidingly upon command by means not shown to move to the right whereupon gear 9 engages clutch 5 and hence is coupled to the mainshaft splines 3, or to move to the left whereupon gear 10 and splines 8 engage clutch 4 and hence becomes coupled to the mainshaft 3. In the condition illustrated, neither gear 9/10 is coupled. The coupling may be assisted by synchro-cone members 14 mated to the dog clutches and sliding along them dependent on what gear 9 or 10 is selected. The cone surfaces on the selected gear and its cone member 14 become aligned; the latter then makes contact with the chamfered teeth 8 on the relevant dog clutch 4 or 5, which in turn couples the selected gear 9 or 10 to take over the rotation of the mainshaft. Springs 6 provide resilience for these synchro-cone engagements.

In many gearboxes, the clutches are slid to engage axially fixed gears, but the gear-pairs slide in this prior art example; and it is to such sliding gear-pair boxes that the invention relates.

As further well-known background from this prior art, each of the gears 9,10 of the pair is in constant mesh with respective gears fixed to one or more countershafts each in constant mesh with an input gear. If gear 9 is clutched to mainshaft 3, one ratio is selected—likewise for gear 10 or other mainshaft gears and clutches such as 15, 16 and not further described here.

One problem with gear pairs such as 9/10 is the installation of an axially retaining clip 17 by which the gear pair move axially as one in response to selector fork 12 being driven by plunger 13, but can rotate always at different speeds. The known spring clip 17 will typically resemble one of the two flanges of the novel clip, seen easily in FIG. 4. It is thus an almost circular snap ring, a resilient ring sometimes known at least in the UK as a "Circlip" and having radial extent and a circumferential gap. The gap allows circumferential and radial contractions and expansions. Such clips are extremely common retaining means, in internally and externally grooved cylindrical walls. They are in general contracted to be presented to internal walls, and allowed to expand into the internal groove to assume slightly less than normal size. Or they may be expanded to be presented opposite external cylindrical grooves, thereafter being allowed to contract and enter into the external groove to assume slightly more than normal size.

In the arrangement of gear-pair 9/10 there are two grooves 18, 19, to be entered, one external and one internal. Gears 9 and 10 telescope together, in that gear 9 has a female extension 20 with the internal groove 18 and gear 10 has a male extension 21 with the external groove 19. The clip 17 is inserted in both grooves 18, 19 and axially holds the gear pair. Drawbacks to this arrangement are (1) there must be telescoping parts; (2) the clip or snap ring must be both contracted and expanded from its normal radius, in order to be offered to each groove in turn for installation; (3) most important, the clip must be broken, if possible, before the gears can be separated. Gears do break as well as wear, and easy servicing, or easy replacements are highly desirable. Very often one gear 9 or 10 will fail before the other, and a necessity to replace only one of the pair would often be attractive and economical. Often, because of tolerances, it is difficult or impossible to break the clip, or possible only after damaging the telescoping parts. The snap ring may be 1.5 mm, and the groove 1.7 mm with a tolerance. So sometimes it will easily rupture, sometimes it is not possible. Another drawback (4) is that there is a limited total radial extent in which the two grooves can be accommodated, and if the mainshaft is to be made larger e.g. for heavier duty work, the total radial extent will diminish even more (unless at least the female gear 9 etc is redesigned of larger diameter).

Transmissions and gear pairs of the type illustrated in FIG. 1 may be seen by reference to U.S. Pat. No. 4,754,665, filed Feb. 5, 1986 and to U.S. Pat. Nos. 3,799,002 and 4,440,037, the disclosures of which are incorporated by reference.

In further explanation of the second drawback (2), the expansion back to normal size of the clip into the internal groove of the "larger" gear with the female extension and then its tapping into place in the groove are fairly straightforward. However, the clip must now be expanded, with a tool which allows the "smaller" gear to be inserted until its mating groove comes opposite. Then a special assembly tool has to be introduced, in order to expand the clip from normal, further into the internal groove, so that the smaller gear can also be introduced. The special tool is typically three fingers on expanding equilateral triangle points, the expansion being by a tapered screw. The smaller gear will have a chamfer at its entering portion, which will hold the clip expanded such that the special tool can be itself undone, i.e. contracted and removed. Then the smaller gear with the male extension is pushed fully home. This maneuver is cumbersome and tricky to perform.

Figure 2:
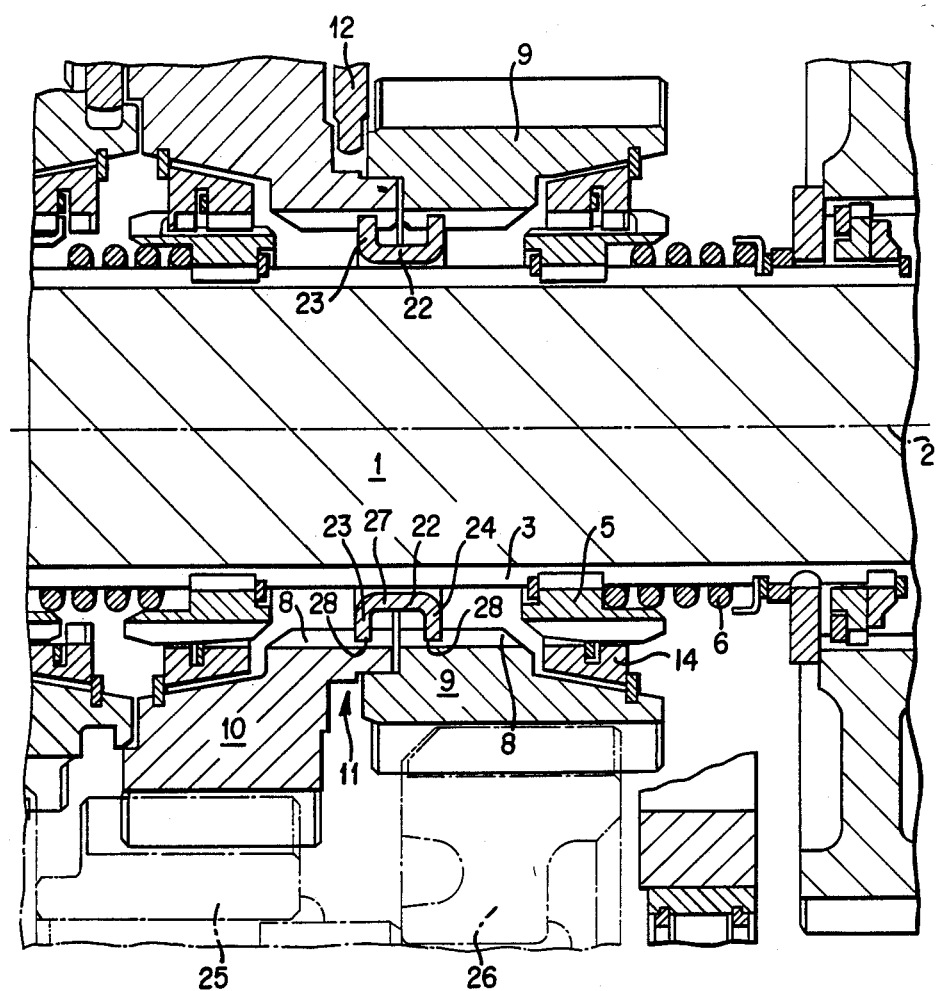
FIG. 2 is a diametrical section on a gearbox, showing the inventively clipped and axially secured gear pair.

Referring to FIG. 2, gears 9 and 10 are held together by a clip 22 which is of a semi-annular or "C" shape and of cross-sectionally a generally U-shape. The "arms" 23, 24 of the U as seen in section (which are really annular flanges) engage in internal annular grooves in the gears 9, 10 and hold them together axially while permitting the independent rotations (needed to be accommodated as stated above by constant meshing of gears 9 and 10 with gears 25 and 26, respectively, both fixed to the countershaft not shown). Clip 22 has an axially rigid cylindrical or tubular web 27 from which the annular flanges 23, 24 extend radially outwardly. The clip can be contracted to enter the gears 9 and 10 and then be aligned to the grooves 28 therein, thereafter the clip is allowed to relax and expand to its non-resiliently deformed condition into the grooves. The axial retaining is now complete.

Separation of the gear pair is easy, they are first slid off the mainshaft as a pair and the clip is easily accessible to a tool, for contraction and removal of the clip. There is no requirement to break the clip. Installation is the reverse, contract the clip with the tool or tools, position the gears as a pair, and align the flanges 23 and 24 to the grooves 28 in the gears.

Figure 3:
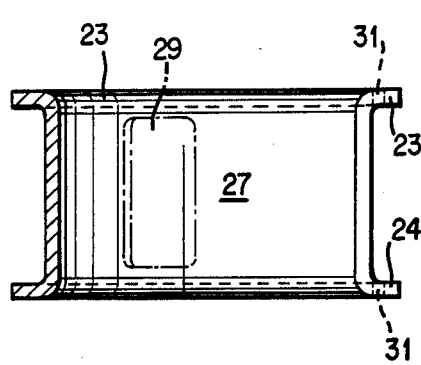
FIG. 3 is an elevation view of the clip of the present invention.
Figure 4:
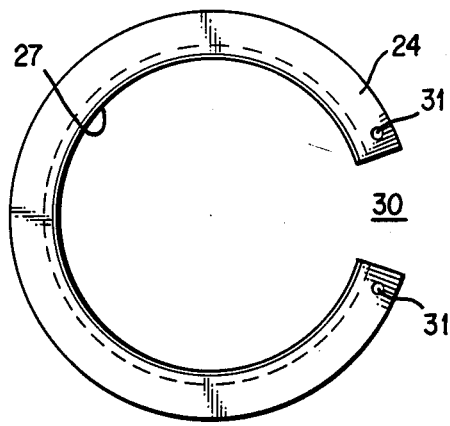
FIG. 4 a plan view of the clip of the present invention.

Referring to FIGS. 3 and 4, the clip is more clearly seen; web 27 axially locating flanges 23, 24 (and hence the grooves of the gears), possible apertures 29 if required for lightness, handling or oil circulation, and a gap 30 so that the spring clip can be compressed, or contracted in diameter and circumference. The contraction is necessary in order to introduce the clip through the internal bore of the gears in turn, until the flange is opposite a respective groove 28.

Contraction to fit through the bore is enabled by introducing pliers into the bore, the ends of the pliers being shaped to engage small holes 31 in the ends of the flanges each side of gap 30, and to release the spring clip to expand into the groove. The pliers are also used to contract the clip again (the holes 31 being designed to remain accessible), when it is required to remove the clip, for instance to service or replace one gear. Such holes and pliers are well known in general.

It will be noted that the prior art arrangement of FIG. 1 required not only contraction but also expansion by the pliers, to fit the clip in an external as well as an internal groove, whereas only contraction are required by the invention.

Figure 5:
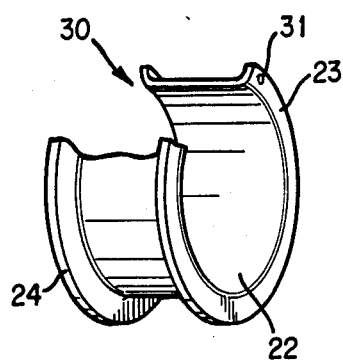
FIG. 5 a perspective of the inventive resilient or spring clip of the present invention.
Figure 6:
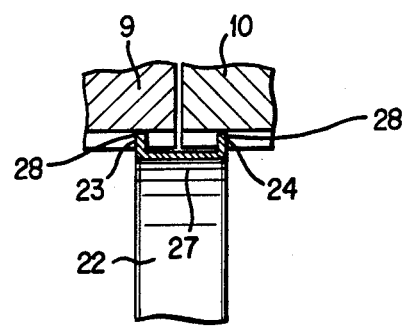
FIG. 6 shows fragmentarily, diagrammatically and in elevation the inventively grooved gears held by the inventive clip.

The clip can be seen in perspective in FIG. 5, with a portion about 15% of its circumferential extent being cut away from one free end. One hole 31 for the pliers can be seen. FIG. 6 shows diagrammatically the assembled clip and gears with flanges 23, 24 installed in the two grooves 28, and axially stiff web 27 holding the gears together axially, but allowing their independent rotations.

Referring again to FIG. 2, the gears 9 and 10 may have parts which telescope together if desired for location, economy in axial length or strength and support, but such telescoping is no longer required in order to accommodate a clip arrangement as 17–19 in FIG. 1.

The inventive arrangement is particularly useful for the sliding gear pairs of the TWIN SPLITTER transmission available from Eaton Corporation, USA and Eaton Limited and Eaton SA in Europe for medium and heavy duty goods vehicles However sliding gear pairs required to be held as described are envisaged to be useful in much smaller, lighter environments as well as other heavy duty vehicular and other operations. Transmissions of this type may be seen by reference to above-mentioned allowed U.S. patent Application Ser. No. 826,436, filed Feb. 5, 1986now U.S. Pat. No. 4,754,665.

In the EATON® TWIN SPLITTER® transmission mentioned above, the mainshaft floats between twin countershafts being thus supported thereby. There would rarely if ever be risk of contact between the inventive clip and the (splined) exterior of the mainshaft. However, the invention is not concerned with the way the parts or the clip are radially supported or located, but merely with removably holding independently rotatable parts axially together. The compressive force required to be exerted through the pliers is found to be quite moderate, just enough to allow the gears to slide together (telescoping or not). Since the two grooves 28 of FIG. 2 are not aligned as in FIG. 1, there is more room to make them deeper in the inventive arrangement without prejudicial loss of strength. EATON and TWIN SPLITTER are both independent Trade marks of Eaton Corporation.

The clip can be made from U-section strip carbon spring steel. After it has been heated to cherry-red temperature, it is bent while its form is maintained, around a mandrel.

Figure 7:
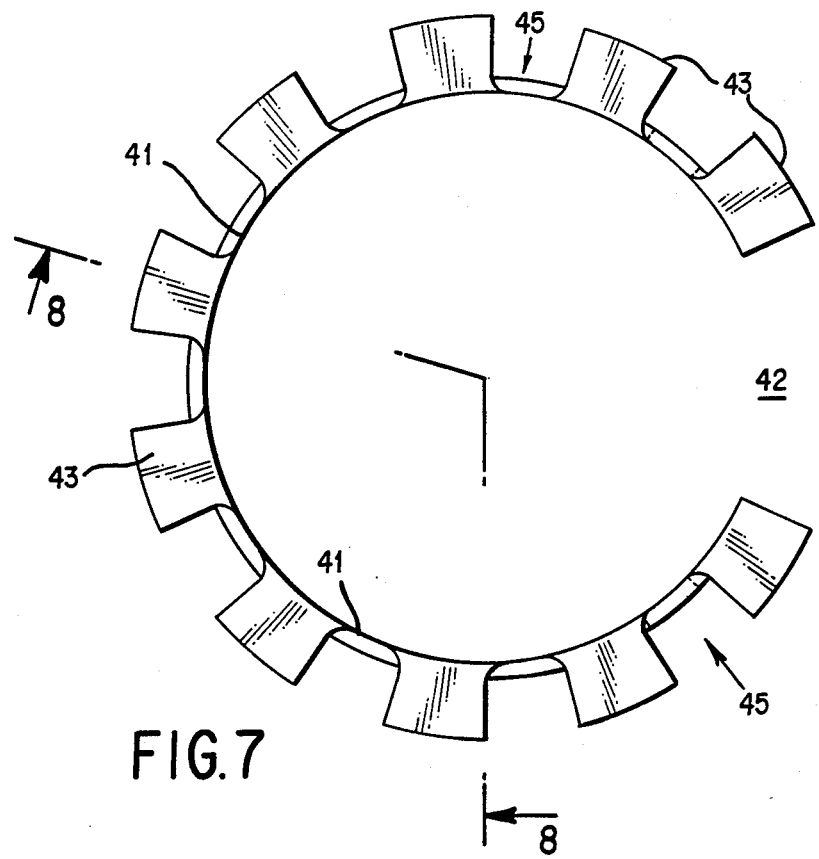
FIG. 7 is plan view (i.e., viewed along the cylindrical axis) and FIG. 8 an elevation on an inventive clip alternative to that of FIGS. 3-5.
Figure 8:
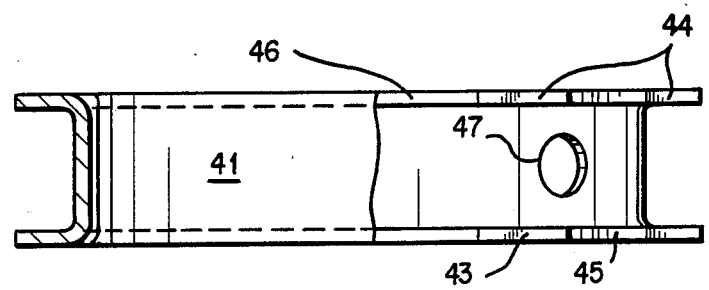

A modified spring clip is shown in the embodiment of FIGS. 7 and 8, having circumferential resilience, comprising an incompletely cylindrical web, at least two sets of outwardly radial projections therefrom, wherein the projections in each set resemble petals with spaces between them at which there is less or no projection from the web, said web comprising an incomplete cylinder in having a gap which allows a cross-sectional resilient contraction.

The spring clip can be used to hold gears together axially in exactly the same way as that featured in FIGS. 2 and 6.

Similar annular grooves in each gear, in an internal bore wall thereof, will receive the spring clip after an initial circumferential compression for its insertion within the bores of each gear, and its finally being allowed to expand into the two grooves as in the previous embodiment.

The series of inventive spaces between the petal-like radial projections facilitate manufacture of the ring, as compared with the more continuous circular flanges of FIGS. 2 and 6.

Referring to FIGS. 7 and 8, a cylindrical web 41 has an interruption at 42. Web 41 has a relatively largish diameter, 74mm compared with its width, 19mm, but a short axis in comparison. At the two ends, axially speaking, of the web are a similar set of radially extending flanges 43 and 44, somewhat resembling flower petals as drawn in plan, and separated by a series of gaps 45 and 46 respectively. There may be two or more holes 47, two round holes are presently preferred, to assist in the compression prior to expansion required for assembly of the clip into grooved parts to be clipped.

The previous embodiment featured a clip in which two or more flanges were circumferentially continuous over the distance between the ends of a circumferential gap analogous to that seen at 42 in FIG. 7. Continuous flanges might present difficulties in manufacture and/or require more annealing, in order to assure the flanges being accurately radial and parallel and to avoid localized or more continuous distortions. Such distortions could prevent location in the grooves of the gears after being allowed to expand, or could inhibit the essential object of relative rotatability between the two gears.

Accordingly, the inventive flanges 43 and 44 are made as respective series of, say, ten each with nine gaps 45, 46 thereby greatly reducing stresses.

The radial extent of the 20 flanges, on the numerical example already given in part, is 20 mm, their thickness is 1.5 mm. The circumferential widths of the flanges could be about equal to those of gaps 45, 46. The two holes 47 may be 8 mm diameter and the web width about 16mm, with a 100° angle separating the two 8 mm holes in the web. These are presently preferred dimensions, and obviously variable at will.

The flexibility in this example is such that the clip must be compressible circumferentially to pass through bores of 87.5 mm diameter and then expandable to a free diameter of 94 mm. The clip is heat treated to Rc 58 file hardness, then a phosphate coat is produced before oil dipping.

In order to grip the clip and compress it in cross-section while introducing it to the internal grooves, a shaping is provided, not shown, near the ends 48 of the web each side of the interruption. A tool similar to "Circlip" pliers would be used. In its compressed state, with the tool still attached, the clip would be, inserted into grooves in a pair of gears, then positioned and then released to clip the gears together. Thus there is shown in FIGS. 7 and 8 a detachable spring clip comprising a cylindrical web which is incomplete in that there is a gap, and at least two series of petal-like flange projections radially outwardly projecting from the web, the projections of each series lying on a planar circle and separated by gaps, such spring clip being circumferentially compressible (to form a smaller radius for entering a bore).

The web could have further, intermediate sets of flanges at different axial positions, for holding more than two rotatable parts together, by grooves in the latter transverse to the cylindrical axis.

The spring clip of FIGS. 7 and 8 could be used to clip an internal insert for receiving or transmitting a drive, to or from a toothed belt. For instance, the spring clip could be expanded outwards, and allowed to contract over and thus clip a piece of metal adapted to rotate. The piece of metal would be preferably of cross-section such that the cap was an odd multiple of half a pitch of the divided petal-like flanges 43, 44. The flanges could then obviously be driven by, or drive the toothed belt (not shown). The holes 47 could be used if required to bolt the insert to the clip.

I claim:

1. A clip (22) comprising a generally circular body having two ends defining a gap (30,42) in the general circle, and resilience to allow firstly a preparatory contraction in the radial cross-section, with reduction of said gap, for the introduction of the clip to a receiving position, and secondly an expansion in cross-section with increase of said gap, for the installation of the clip to a clipping position, wherein the body comprises:

a tubular web portion (27,41) and two axially spaced radially projecting flanges (23, 24: 43, 44) therefrom to enable said installation in two internal annular grooves (28):

a formation (31) towards the two ends of at least one of the flanges to enable gripping and transport by a contracting tool to the receiving position; and one or more holes (47) in the web portion to facilitate resilient contraction thereof.

2. A clip according to claim 1, characterized by further gaps (45, 46) which are located in the flanges (43, 44) at circumferential points where the web (41) is continuous.

* * * * *